(12) United States Patent
Field

(10) Patent No.: X9137
(45) Date of Patent: Oct. 6, 1835

(54) SPINNG, SPEEDER, DOUBLE

(76) Inventor: William Field

William Field, of North Providence State of Rhode Island,

Letters Patent.

The schedule referred to in these Letters Patent and making part of the same
containing a description in the words of the said William Field himself of
his improvement in a machine called the double speeder.

To all to whom these presents shall come,

Be it known that I William Field of north Providence in the County of
Providence and State of Rhode Island, and Providence Plantations, have
invented and made a new and useful improvement in the machine called
the Double speeder used for making roving in the manufacture of Cotton
and the following is a full and exact description of the same, It consists in a plan of compressing the roving on the spool so hard or
compact that the same quantity may be put on a spool of only one fifth of
the common size. A machine with the improvement will occupy only one
half of the room, will require much less power, and will run at least one
third faster than common speeders. I have retained in connection with my
improvement the usual plan of drawing twisting and winding the roving,
except the difference of running the spools faster than the flyer to take up
the roving instead of permitting them to fall back, sufficient to effect the
same thing as in the common manner.

The flyer is about one half the usual length and diameter and
is supported wholly at the top and has a hoop at the lower end of the arms
to prevent them from expanding when in operation. The roving passes from the
rollers through the nose of the flyer and the arms to the spool, By the application of my improvement the roving is condensed on the
spools by pressing against its surface, a thin circular plate about the di-
ameter of the flyer which receives a rotary motion from the friction of the
spool, the plate may be as thick as the traverse motion of the spool will admit, between the lower head of the spool when up, and the bottom of the flyer, leaving sufficient space between the plate and the bottom of the flyer for the roving to pass round, as it winds on the spool, The plate for each spindle in a machine runs on an upright stud that stands in a rail placed in the rear of the spindles; the rail is supported by stands at each end on which it will slide backward and forward very easy at right angles with the spindles. The circular plates are placed on the rail with their surfaces all on a line. By sliding the rail which is done by a spring or weight up to the spools the edges of the plates will press constantly on the roving and equally on all the spools, The roving in this manner is compressed to almost any extent, As the spools increase in size by the winding on of the roving the rail moves back from the spindles, by the pressure of the edges of the plates on the spools. Connected with this, is another important motion, the cones in the machine having my improvement, are belted and the guide that moves the belt is operated altogether different from those in other speeders. I cause it to move by a weight or spring and its motion is governed by the filling of the spools. In other speeders there is no ~~other~~ connection between the filling of the spools and the motion of the belt guide. To produce this operation I have placed on the guide a cycloid rack, I have also between the rail before described and a rack placed a lever one edge of which is made to catch in the rack and prevents it moving by the weight of a spring faster than the spool fills and requires the movement to graduate its motion. As the spools fill the rail moves back the lever attached to it moves out of the rack, and the belt guide is drawn forward by the spring or weight. In this way the spool graduates its own motion so as to take up the roving uniformly from the commencement of the filling of the spool to its completion. There may be various modes of connecting the filling of the spools with the motion of the belt guide, I claim as part of ~~[illegible]~~ my improvement the connection generally. I have also applied a different form of Hart to raise and fall the spools, on the common speeder hart the rise and fall are equal, that is the rise is no quicker than the fall on a speeder with my improvement, the hart is calculated to raise the spool faster than it falls, in order that a less quantity of roving may be deposited when the spool is rising
it being necessary on account of the circular plates not acting directly on
the course which the spool receives when rising, but acting on both courses
when the spool is falling.
1st. what I claim as my improvement and not previously known is
the plan of compressing roving on spools by circular plates and having a
rotary motion acquired by their pressure on the spools, the edges of which
act on the roving as it is received from the flyers, and thereby condenses
it so that a much greater quantity can be deposited on spools of the same
size: 2nd. The sliding rail in the rear of the spools on which the cir
cular plates are placed and the connection between the increasing size of the
spools, and the transverse motion of the belt guide so that the spools
may cause the variation of speed which their constantly increasing size
requires. 3d. The application of a heart, for transversing the spools so
formed as to cause them to rise with a greater velocity than they fall, so
that a less quantity of roving may be deposited on the spools when
rising than when falling, North Providence, August 27. 1835.

William Field

N. B. The Model accompanying this Specification is not intended
to represent an entire Machine but those parts only which
are generally connected with my improvement William Field Witnesses
Edw. S. Wilkinson
David Safavour